(12) United States Patent
Mailfert et al.

(10) Patent No.: US 11,608,775 B1
(45) Date of Patent: Mar. 21, 2023

(54) CONTROL METHOD FOR VARIABLE TURBINE NOZZLE OF TURBOCHARGER DURING ENGINE BRAKING

(71) Applicant: Garrett Transportation I Inc., Torrance, CA (US)

(72) Inventors: Julien Mailfert, Ludres (FR); Francois Kuehn, Golbey (FR); Matteo Santamarina, Turin (IT); Aurelien Tingaud, Capavenir Vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/815,201

(22) Filed: Jul. 26, 2022

(51) Int. Cl.
*F02B 37/24* (2006.01)
*F02D 9/06* (2006.01)

(52) U.S. Cl.
CPC ............... *F02B 37/24* (2013.01); *F02D 9/06* (2013.01); *F01N 2240/36* (2013.01)

(58) Field of Classification Search
CPC ......... F02B 37/24; F02D 9/06; F01N 2240/36
See application file for complete search history.

(56) References Cited

U.S. PATENT DOCUMENTS

| | | | |
|---|---|---|---|
| 6,652,414 B1 | 11/2003 | Banks, III | |
| 2002/0174849 A1 | 11/2002 | Ruggiero et al. | |
| 2015/0040859 A1 | 2/2015 | Scavone et al. | |
| 2016/0169128 A1 | 6/2016 | Rammer et al. | |
| 2016/0312712 A1 | 10/2016 | Marlett et al. | |
| 2019/0040802 A1* | 2/2019 | Lilly | F02D 13/04 |

* cited by examiner

*Primary Examiner* — Audrey B. Walter
*Assistant Examiner* — Edward Bushard
(74) *Attorney, Agent, or Firm* — John C. James (57) ABSTRACT

A control method for use in an engine braking maneuver for an internal combustion engine (ICE) system including a turbocharger having a variable-nozzle turbine (VNT), the ICE system further including an exhaust flap disposed in an exhaust line downstream of the variable-nozzle turbine. Prior to closing the exhaust flap, the VNT vanes are first parked in a fully open position. After the exhaust flap closes, the vanes are pivoted to a fully closed position and are continuously urged against a hard stop as long as the exhaust flap is closed. Termination of engine braking entails pivoting the vanes back to the fully open position, whereupon the exhaust flap is opened.

6 Claims, 7 Drawing Sheets

CONTROL METHOD FOR VARIABLE TURBINE NOZZLE OF TURBOCHARGER DURING ENGINE BRAKING

BACKGROUND OF THE INVENTION

The present invention relates to internal combustion engines equipped with a turbocharger having a variable-nozzle turbine by virtue of vanes of variable setting angle for regulating exhaust gas flow to the turbine. The invention more specifically relates to methods for controlling the variable vanes during an engine braking maneuver in which an exhaust flap is closed for raising a back-pressure on the engine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. The turbine housing typically is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger.

One type of variable-geometry turbocharger is the variable-nozzle turbocharger (VNT), which includes an array of variable vanes in the turbine nozzle. The vanes are rotatably mounted to a nozzle ring, which forms one wall of the nozzle. The vanes are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

Turbocharged internal combustion engine systems, especially diesel engine systems for trucks, are often equipped with an engine braking system that includes an exhaust flap disposed in the exhaust line downstream of the turbocharger. Closing the exhaust flap results in an increased back-pressure on the engine so that the engine exerts a braking torque on the vehicle drive train, thereby braking the vehicle. Operation of the exhaust flap also exerts pressure effects on the turbine of the turbocharger, which effects can be undesirable in some cases. In particular, the pressure effects can cause aerodynamic instability of the variable vanes of the nozzle.

The present disclosure is directed toward improvements in control methods for the vanes of a variable turbine nozzle during an engine braking maneuver.

BRIEF SUMMARY OF THE DISCLOSURE

The present disclosure describes control methods that can mitigate or substantially eliminate harmful vane instabilities during an engine braking maneuver. In one embodiment herein, a control method is described for use in an engine braking maneuver for an internal combustion engine (ICE) system including a turbocharger having a variable-nozzle turbine (VNT), the ICE system further comprising an exhaust flap disposed in an exhaust line downstream of the variable-nozzle turbine. The control method comprises the steps of:
(a) receiving a start command to begin engine braking;
(b) upon receipt of the start command, initiating pivoting of vanes of the VNT toward a fully open position;
(c) after step (b), actuating the exhaust flap to move to a predetermined further-closed position;
(d) after step (c), actuating the vanes of the VNT to pivot to a fully closed position against a hard stop, and continuously urging the vanes against the hard stop as long as the exhaust flap is in the further-closed position;
(e) receiving a stop command to terminate engine braking;
(f) upon receipt of the stop command, initiating pivoting of the vanes to pivot toward the fully open position; and
(g) after step (f), actuating the exhaust flap to move to an open position.

In accordance with one embodiment of the invention, the exhaust flap reaches the further-closed position in step (c) only after the vanes have reached their fully open position in step (b). It is also advantageous in some cases for the exhaust flap to reach the open position in step (g) only after the vanes have reached their fully open position in step (f).

Optionally, the exhaust flap can begin to move to the further-closed position in step (c) before the vanes have reached their fully open position in step (b). Similarly, the exhaust flap can begin to move to the open position in step (g) before the vanes have reached their fully open position in step (f).

In accordance with an alternative embodiment, step (b) can be omitted, such that the exhaust flap is moved to the further-closed position while the vanes remain in their current position. Once the exhaust flap is in the further-closed position, the vanes are pivoted to the fully closed position against the hard stop, per step (d) above.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
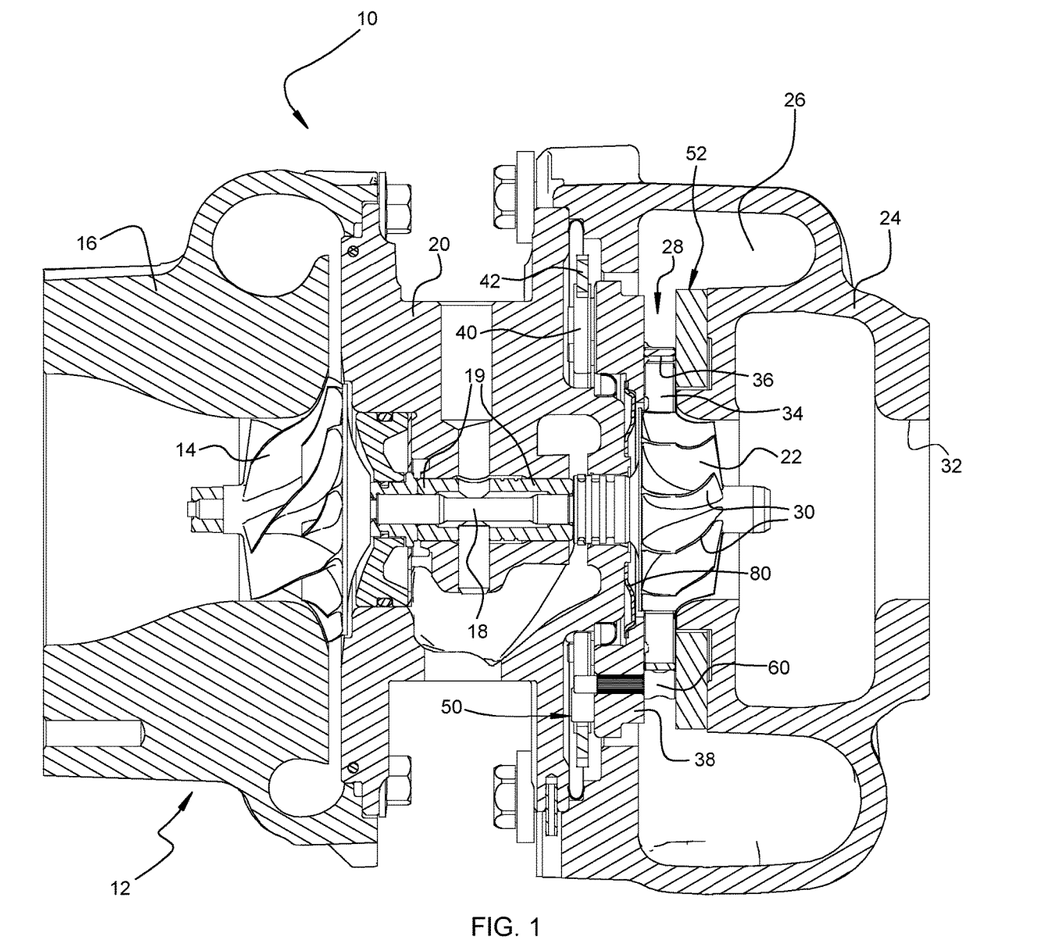
FIG. 1 is a cross-sectional view of a turbocharger having a variable-vane turbine nozzle.

A turbocharger 10 in accordance with one embodiment of the invention is illustrated in cross-sectional view in FIG. 1. The turbocharger comprises a compressor 12 having a compressor wheel or impeller 14 mounted in a compressor housing 16 on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

Figure 2:
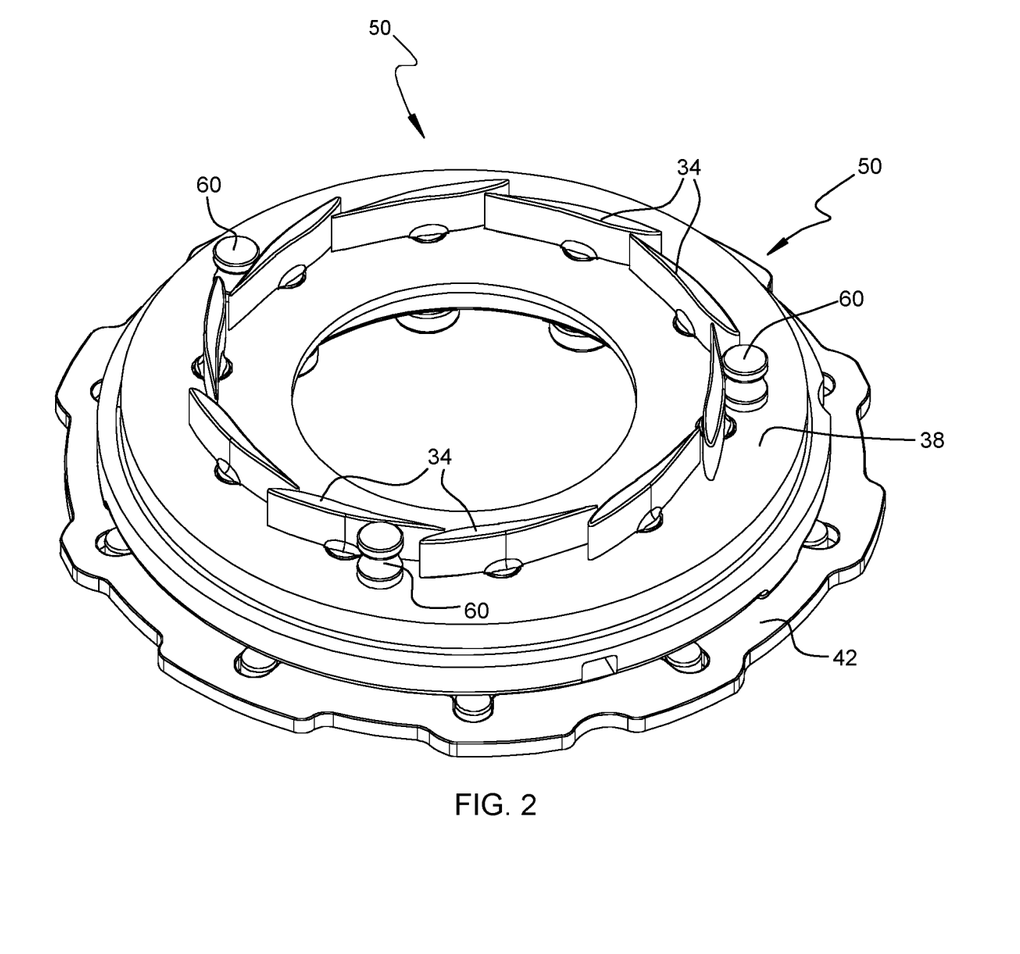
FIG. 2 is an isometric view of one embodiment of a variable-vane assembly for the turbocharger, showing the vane side of the assembly.
Figure 4:
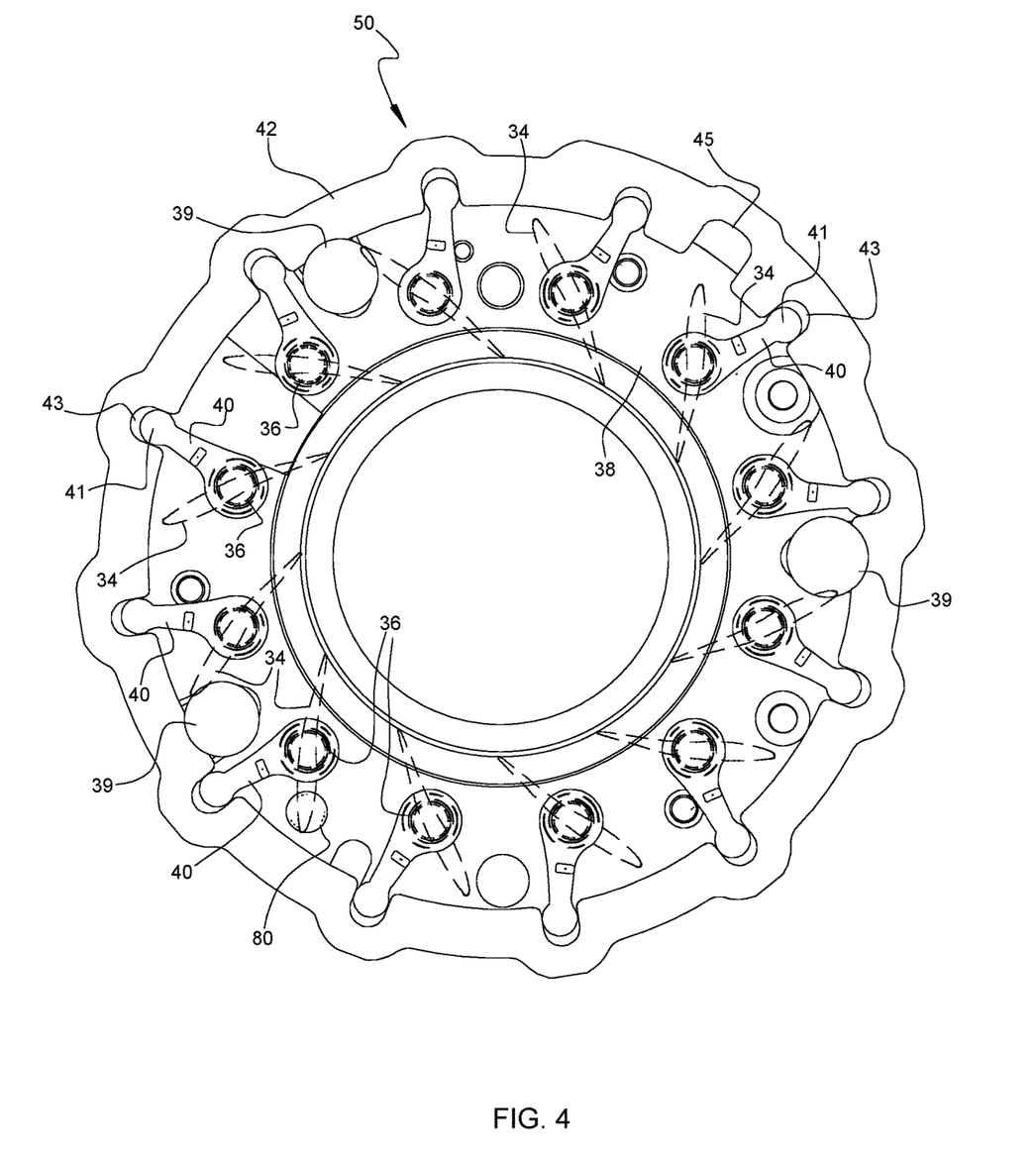
FIG. 4 is a plan view of an embodiment of a variable-vane assembly as seen from the vane arm side, showing the vanes in a fully open position.

Reference is now made to FIGS. 2 and 4, which depict a subassembly of the turbocharger, comprising a variable-vane assembly for the turbine nozzle 28 for varying the cross-sectional flow area through the nozzle so as to regulate flow into the turbine wheel. The assembly includes a plurality of vanes 34 that are circumferentially spaced about the nozzle. Each vane is affixed to an axle 36 that passes through a bearing aperture in a generally annular nozzle ring 38 that is mounted coaxially with respect to the turbine wheel 22. Each axle 36 is rotatable about its axis for rotating the attached vane. The nozzle ring 38 forms one wall of the flow passage of the nozzle 28. Each of the axles 36 has a vane arm 40 affixed to an end of the axle that protrudes out from the nozzle ring 38. Distal ends 41 of the vane arms 40 are engaged in generally U-shaped recesses 43 defined in the radially inner periphery of an annular unison ring 42 (also referred to as an actuator ring) that is rotatable about its axis and that is coaxial with the nozzle ring 38. Guides 39 mounted on the nozzle ring 38 are engaged with the inner periphery of the unison ring for guiding its rotational movement so that it remains substantially concentric with the nozzle ring, and for preventing the unison ring from moving in the axial direction away from the nozzle ring. An actuator (not shown) is connected to the unison ring 42 for rotating it about its axis. When the unison ring is rotated, the vane arms 40 are rotated to cause the axles 36 to rotate about their axes, thereby rotating the vanes 34 so as to vary the cross-sectional flow area through the nozzle 28.

In the illustrated embodiment, the variable vane mechanism is provided in the form of a unit or cartridge 50 (FIG. 1) that is installable into and removable from the turbocharger. The unit 50 comprises the nozzle ring 38, vanes 34, axles 36, vane arms 40, and unison ring 42. The unit works in cooperation with an insert 52 that is annular and is received into a correspondingly annular recess defined in the turbine housing 24. The insert is axially spaced from the nozzle ring 38 such that the vanes 34 extend between the nozzle ring 38 and the insert 52.

The turbocharger includes a heat shroud 80 (FIG. 1) that is captively retained between the nozzle ring 38 and the center housing 20 when the variable-vane unit 50 is installed into the turbocharger. The heat shroud 80 provides sealing between the nozzle ring and center housing to prevent hot exhaust gas from migrating between these parts into the cavity in which the vane arms 40 and unison ring 42 are disposed. The heat shroud 80 advantageously is a resiliently elastic material such as spring steel or the like, and the shroud is configured so that it is compressed in the axial direction between the nozzle ring 38 and the center housing 20 so that the restoring force of the shroud urges the nozzle ring 38 axially toward the turbine wheel 22 (to the right in FIG. 1).

A plurality of spacers 60 (FIGS. 1 and 2) are mounted to the nozzle ring 38 and project toward the insert 52. Ends of the spacers 60 abut the insert 52 (as urged by the resilient heat shroud 80 described in the preceding paragraph) for maintaining the desired axial spacing between the insert and the nozzle ring 38. The spacers thereby help ensure that there are small axial clearances between the ends of the vanes 34 and the nozzle ring 38 on one end and the insert 52 on the other end. The axial spacing set by the spacers 60 is designed to ensure that those clearance do not become too small, which could cause binding of the vanes, or too large, which could compromise turbine efficiency.

FIG. 2 shows the vane side of the variable-vane assembly, with the vanes 34 in their fully closed position, whereas FIG. 4 shows the opposite vane arm side of the assembly and shows the vanes (in dashed lines) in their fully open position. With particular reference to FIG. 4, the unison ring 42 includes an actuator notch 45 for receiving an end of a crank (not shown) that is part of a kinematic chain between an actuator (not shown) and the unison ring. The crank is rotated by the actuator so as to impart rotational movement to the unison ring in a clockwise direction in FIG. 4 to move the vanes toward their open position, or in a counterclockwise direction to move the vanes toward their closed position. As shown in FIG. 4, the unison ring has been rotated clockwise to the fully open position. The recesses 43 in the ring's inner periphery therefore have driven the distal ends 41 of the vane arms 40 to cause the vane axles 36 to rotate clockwise and place the vanes in their fully open position.

Figure 3:
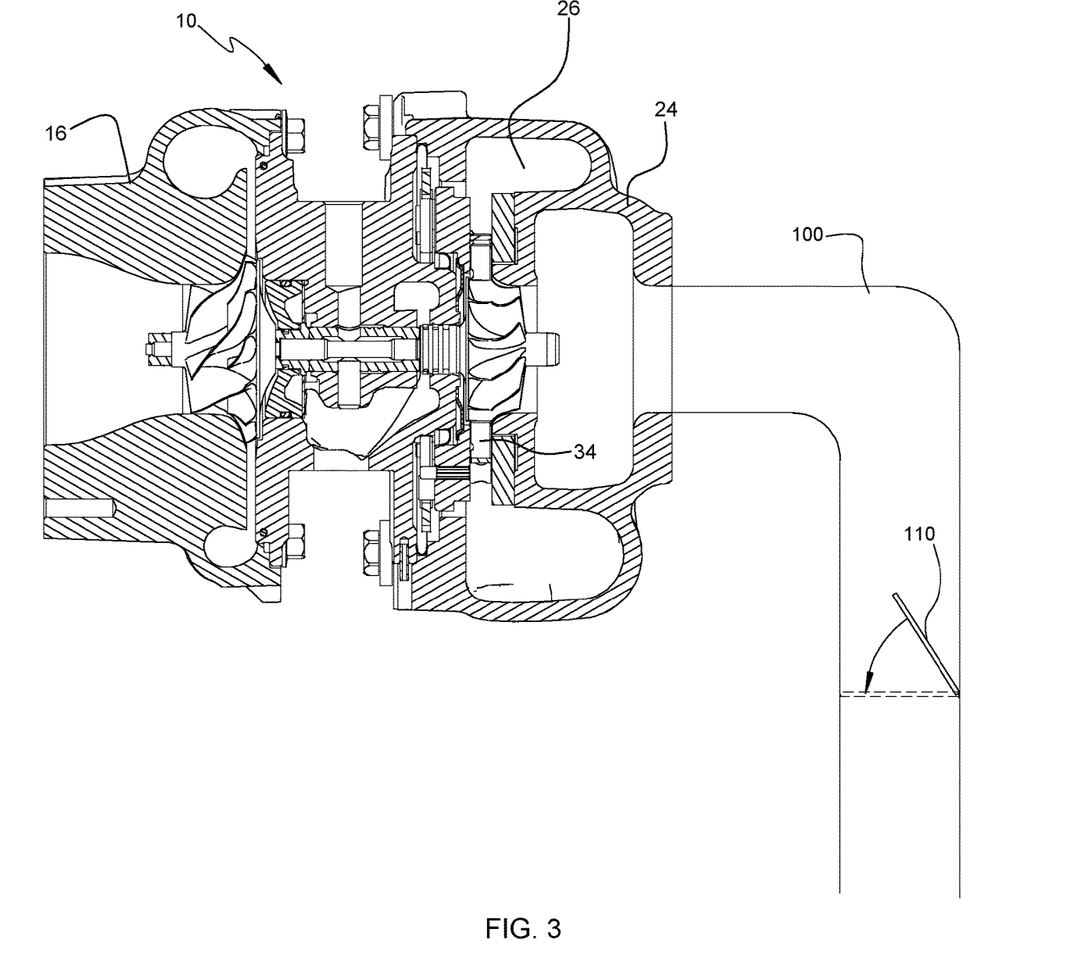
FIG. 3 is a schematic depiction of the turbocharger of FIG. 1 connected to an exhaust pipe in which is arranged an exhaust flap for executing engine braking.

With reference to FIG. 3, in some turbocharged internal combustion engine systems employing a turbocharger with variable turbine nozzle as described above, the exhaust pipe 100 carrying exhaust gases away from the turbine and toward the exhaust system includes an exhaust flap 110 that can be opened or closed by actuation of a suitable actuator (not shown). The exhaust flap is used for the purpose of engine braking. When the exhaust flap is closed (as shown in dashed lines in FIG. 3), it creates a high back-pressure on the engine, resulting in engine braking. Once the need for engine braking ceases, the exhaust flap is opened, relieving the high back-pressure and terminating engine braking.

When the turbocharger includes a variable-vane assembly, it has been found that engine exhaust pulsation during engine braking can create high dynamic pressure and a strong pressure gradient across the variable nozzle mechanism, leading to phenomena such as vane fluttering and high-frequency vibrations in the kinematic chain that actuates the vanes to pivot. These phenomena can cause accelerated wear in the components of the kinematic chain.

The embodiments of the invention described herein are capable of mitigating such accelerated wear of the variable-vane mechanism, by means of a particular control method for the vanes in conjunction with the movement of the exhaust flap, as further described below.

Figure 5:
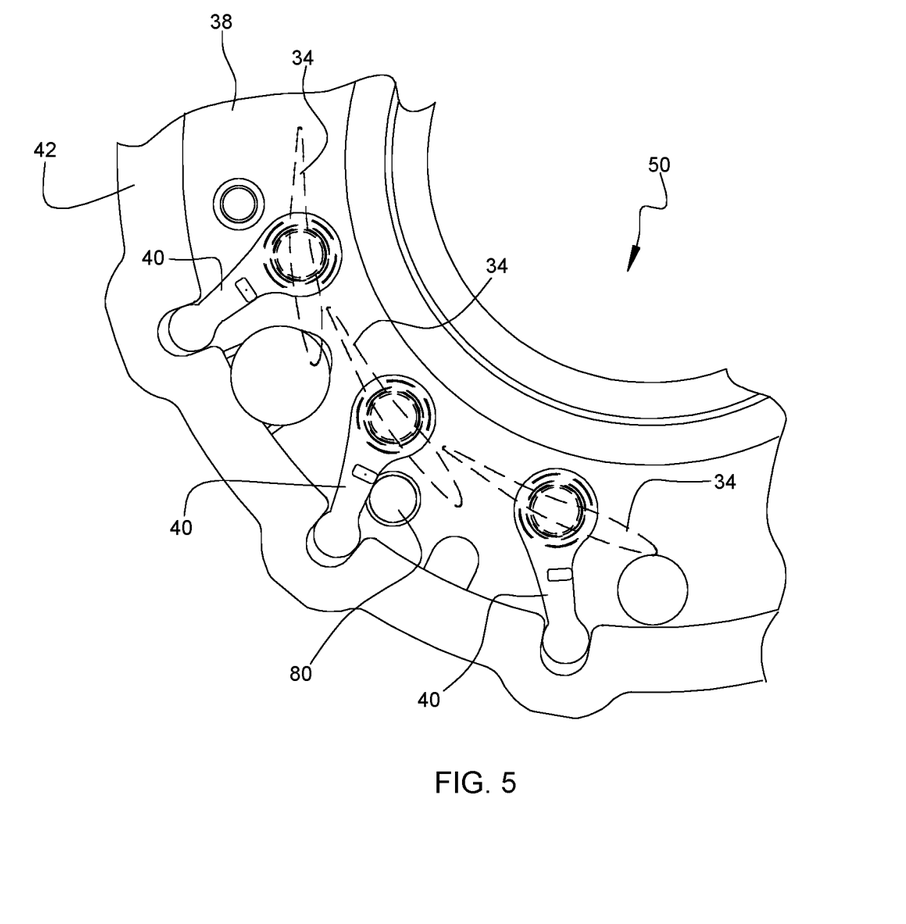
FIG. 5 is a fragmentary view of the variable-vane assembly of FIG. 4, showing the vanes in a fully closed position.

With reference to FIG. 5, which shows a portion of the variable-vane mechanism 50, the mechanism includes a hard stop 80 defining a fully closed position of the vanes 34. In this illustrated embodiment, the hard stop is configured and located to be abutted by one of the vane arms 40 when the unison ring 42 is rotated far enough in the counterclockwise direction in FIG. 5, which is the direction for pivoting the vanes further closed. Thus, the hard stop 80 limits the pivoting of the vanes in the closed direction, thereby defining the fully closed vane position. The invention is not limited to the use of a hard stop that engages a vane arm; alternatively, a hard stop that engages a vane airfoil, or any other suitable feature for limiting the closure of the vanes, could be used instead.

Figure 6:
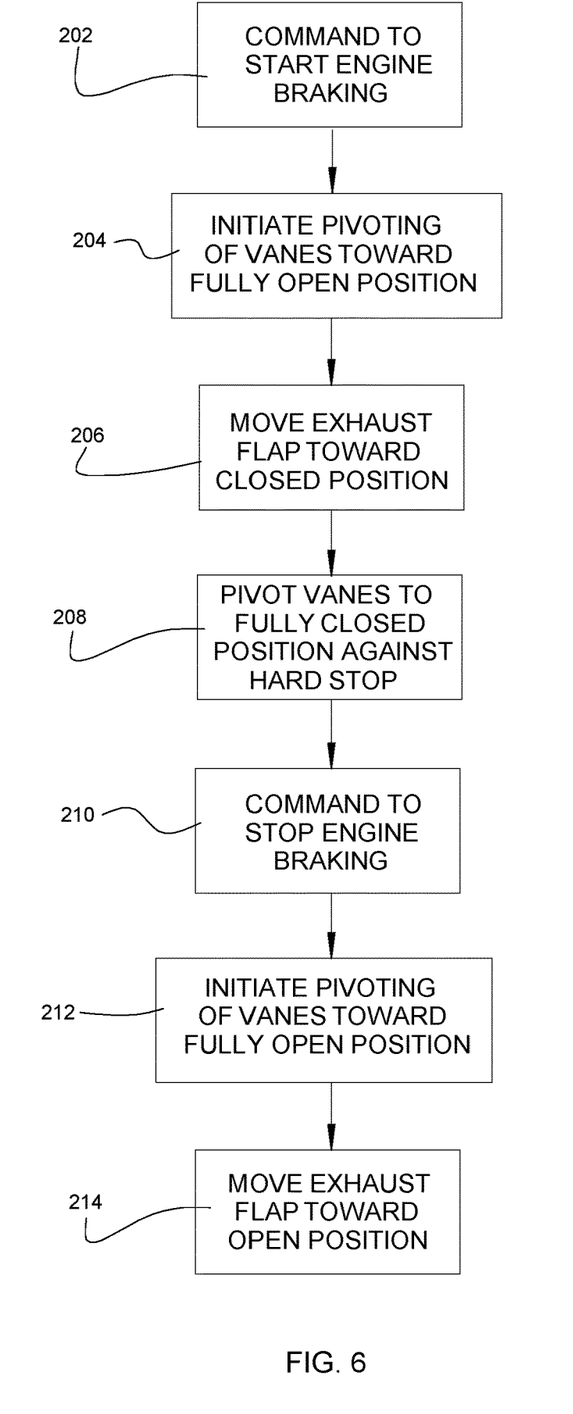
FIG. 6 is a flow chart depicting the steps of a control method in accordance with an embodiment of the invention.

In accordance with embodiments of the invention, a control method is provided for an engine braking maneuver in a turbocharged engine system having a variable-vane mechanism equipped with such a hard stop for the fully closed vane position. With reference to FIG. 6, steps of a control method in accordance with one embodiment of the invention are depicted. The control method comprises the steps of:

Step 202: The control method begins by receiving a start command to begin engine braking. The start-engine-braking command can be issued in any suitable controller or control unit for the engine system, such as the engine control unit (ECU). The start command is received by a control module, comprising a microprocessor and a memory device containing programmed instructions executable by the microprocessor for carrying out the steps of the control method. The control module can be a part of the ECU or can be a standalone controller.

Step 204: Upon the control module's receipt of the start command, the control module initiates pivoting of the vanes of the variable-vane assembly toward a fully open position. This can be accomplished, for example, by the control module issuing a command to a controllable actuator to cause the actuator to rotate the unison ring of the variable-vane assembly in the direction to cause the vanes to move toward the fully open position.

Step 206: After step 204, that is, after the vanes have at least started pivoting toward the fully open position, the control module then issues a command to actuate the exhaust flap to move to a predetermined further-closed position thereof, via a suitable actuator for the exhaust flap which is in communication with the control module. The vanes can have reached the fully open position before the exhaust flap begins to move to the further-closed position, or alternatively the exhaust flap can begin to move while the vanes are still in the process of pivoting to their fully open position.

Step 208: After step 206, that is, after the exhaust flap has reached its further-closed position, the control module then issues a command to actuate the vanes to pivot to a fully closed position against the hard stop, and to continuously urge the vanes against the hard stop as long as the exhaust flap is in the further-closed position. This fully closed position of the vanes, continuously urged against the hard stop, is a safer position for the vanes than any other position of the vanes during the high dynamic pressure and high pressure gradient conditions across the variable-vane assembly resulting from engine exhaust gas pulsation during engine braking.

Step 210: Once the need for engine braking has ceased, the control module next receives a stop command to terminate engine braking.

Step 212: Upon receipt of the stop command, the control module initiates pivoting of the vanes to pivot toward the fully open position.

Step 214: After step 212, that is, after the vanes have at least begun to pivot toward their fully open position, the control module then issues a command to actuate the exhaust flap to move to an open position.

Figure 7:
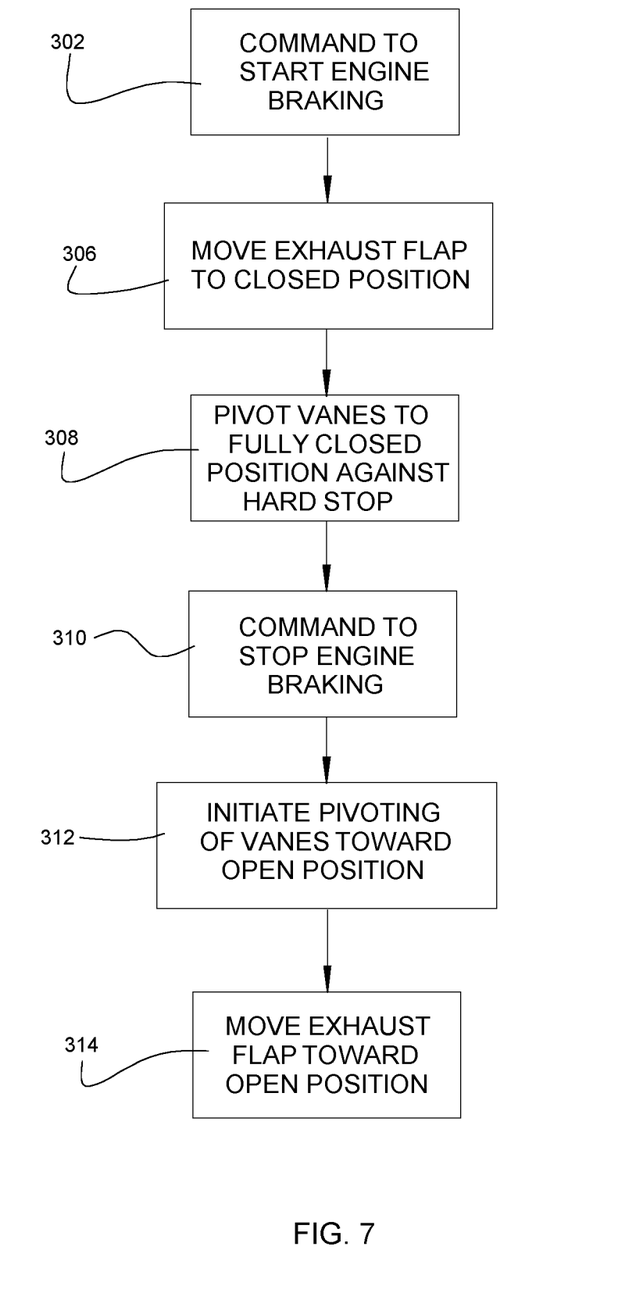
FIG. 7 is a flow chart depicting the steps of a control method in accordance with an alternative embodiment of the invention.

FIG. 7 depicts steps of a control method in accordance with an alternative embodiment of the invention. The control method of the alternative embodiment is generally similar to that of the method of FIG. 6, differing in that the step 204 of first opening the vanes before closing the exhaust flap is omitted. Thus, in accordance with the control method of FIG. 7, in step 302 the command to start engine braking is received; in step 306, the exhaust flap is moved to the further-closed position; in step 308 the vanes are pivoted to their fully closed position against the hard stop, and are continuously urged against the hard stop as long as the exhaust flap is closed; in step 310, a command to stop engine braking is received; in step 312 the vanes are pivoted toward their open position (but may not reach the fully open position); and in step 314 the exhaust flap is opened.

By employing the control method in accordance with embodiments of the invention, potentially harmful fluttering of the vanes and vibration of the vane assembly components can be eliminated or substantially reduced in intensity. The benefits of the invention stem from the positioning of the vanes in the fully closed position, urged against the fully closed hard stop, during the time when the exhaust flap is closed for engine braking.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A control method for use in an engine braking maneuver for an internal combustion engine (ICE) system including a turbocharger having a variable-nozzle turbine (VNT), the ICE system further comprising an exhaust flap disposed in an exhaust line downstream of the variable-nozzle turbine, the control method comprising the steps of:

(a) receiving a start command to begin engine braking;

(b) upon receipt of the start command, initiating pivoting of vanes of the VNT toward a fully open position;

(c) after step (b), actuating the exhaust flap to move to a predetermined further-closed position;

(d) after step (c), actuating the vanes of the VNT to pivot to a fully closed position against a hard stop, and continuously urging the vanes against the hard stop as long as the exhaust flap is in the further-closed position;

(e) receiving a stop command to terminate engine braking;

(f) upon receipt of the stop command, initiating pivoting of the vanes to pivot toward the fully open position; and (g) after step (f), actuating the exhaust flap to move to an open position.

2. The control method of claim 1, wherein the exhaust flap reaches the further-closed position in step (c) only after the vanes have reached the fully open position in step (b).

3. The control method of claim 1, wherein the exhaust flap reaches the open position in step (g) only after the vanes have reached the fully open position in step (f).

4. The control method of claim 1, wherein the exhaust flap begins to move to the further-closed position in step (c) before the vanes have reached the fully open position in step (b).

5. The control method of claim 1, wherein the exhaust flap begins to move to the open position in step (g) before the vanes have reached the fully open position in step (f).

6. A control method for use in an engine braking maneuver for an internal combustion engine (ICE) system including a turbocharger having a variable-nozzle turbine (VNT), the ICE system further comprising an exhaust flap disposed in an exhaust line downstream of the variable-nozzle turbine, the control method comprising the steps of:

(1) receiving a start command to begin engine braking;

(2) after step (1), actuating the exhaust flap to move to a predetermined further-closed position;

(3) after step (2), actuating the vanes of the VNT to pivot to a fully closed position against a hard stop, and continuously urging the vanes against the hard stop as long as the exhaust flap is in the further-closed position;

(4) receiving a stop command to terminate engine braking;

(5) upon receipt of the stop command, initiating pivoting of the vanes to pivot toward the fully open position; and (6) after step (5), actuating the exhaust flap to move to an open position.

* * * * *